US006194520B1

(12) United States Patent
Cheruvu et al.

(10) Patent No.: US 6,194,520 B1
(45) Date of Patent: *Feb. 27, 2001

(54) ETHYLENE POLYMER RESINS FOR BLOW MOLDING APPLICATIONS

(75) Inventors: Subrahmanyam Cheruvu, Robbinsville; Thomas E. Nowlin, West Windsor; S. Christine Ong, Warren, all of NJ (US); Giyarpuram N. Prasad, Melbourne (AU); Paul P. Tong, Watchung, NJ (US)

(73) Assignee: Mobil Oil Corporation, Fairfax, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/083,864

(22) Filed: Jun. 28, 1993

Related U.S. Application Data

(63) Continuation of application No. 07/857,343, filed on Mar. 25, 1992, now abandoned, which is a continuation-in-part of application No. 07/665,054, filed on Mar. 6, 1991, now abandoned.

(51) Int. Cl.⁷ ..................................................... C08L 23/08

(52) U.S. Cl. ........................... 525/240; 525/53; 525/247; 525/268; 525/270; 525/320; 525/324

(58) Field of Search .............................. 525/240, 53, 247, 525/268, 270, 320, 324; 264/523, 331.17

(56) References Cited

U.S. PATENT DOCUMENTS

| | | | |
|---|---|---|---|
| 4,048,412 | 9/1977 | Caumartin et al. | 526/65 |
| 4,336,352 | 6/1982 | Sakurai et al. | 525/240 |
| 4,338,424 | 7/1982 | Morita et al. | 526/65 |
| 4,461,873 | 7/1984 | Bailey et al. | 525/240 |
| 4,481,301 | 11/1984 | Nowlin et al. | 502/104 |
| 4,525,322 | 6/1985 | Page et al. | 264/531 |
| 4,547,551 | 10/1985 | Bailey et al. | 525/240 |
| 4,603,173 | 7/1986 | Mack et al. | 525/194 |
| 4,703,094 | 10/1987 | Raufast | 526/65 |
| 4,918,038 | * 4/1990 | Samuels et al. | 502/112 |
| 4,975,485 | * 12/1990 | Sato et al. | 525/240 |
| 5,047,468 | 9/1991 | Lee et al. | 525/53 |

FOREIGN PATENT DOCUMENTS

| | | |
|---|---|---|
| 369436 | 5/1990 | (EP) . |
| 0369436 | 5/1990 | (EP) . |

* cited by examiner

Primary Examiner—Fred Teskin (57) ABSTRACT

A class of relatively high molecular weight, high density ethylene polymer blends is disclosed capable of being blow molded with excellent processability into articles, e.g., bottles, of superior mechanical and other properties, such blends having a density of at least about 0.930 g/cc, a flow index ($I_{21}$) of at least about 2 g/10 min., a melt flow ratio (MFR) of at least about 60, and a polydispersity index of at least about 8, the polymers of said blend consisting essentially of at least about 0.3 weight fraction of a relatively high molecular weight (HMW) component having a density of at least about 0.900 g/cc, a flow index or high load melt index ($I_{21}$) of at least about 0.2 g/10 min., and a flow ratio (FR) at least about 10, and a relatively low molecular weight (LMW) component having a density of at least about 0.930 g/cc and a melt index ($I_2$) no greater than about 1000 g/10 min.

11 Claims, 1 Drawing Sheet

ETHYLENE POLYMER RESINS FOR BLOW MOLDING APPLICATIONS

CROSS-REFERENCE TO RELATED APPLICATION

This is a continuation of application Ser. No. 07/857,343, filed Mar. 25, 1992, now abandoned, which is a continuation-in-part of application Ser. No. 07/665,054, filed Mar. 6, 1991, now abandoned, by A. H. Ali et al.

BACKGROUND OF THE INVENTION

1. Field of the Invention

This invention relates to relatively high density ethylene polymers which are particularly suitable for blow molding and profile extrusion applications.

2. Information Disclosure Statement Including Description of Related Art

The following information is disclosed in accordance with the terms of 37 CFR 1.56, 1.97 and 1.98.

U.S. Pat. No. 4,336,352, issued Jun. 22, 1982 to Sakurai et al., and U.S. Pat. No. 4,525,322, issued Jun. 25, 1985 to Page et al., each discloses blow molding resin compositions composed of three ethylene polymers of different molecular weights, and states that such resins have satisfactory die swell as compared with compositions containing two ethylene polymers which are indicated to exhibit a less than satisfactory swell.

U.S. Pat. No. 4,603,173, issued Jul. 19, 1986 to Mack et al., discloses polyethylene blow molding resins obtained by lightly branching with free radical initiators compositions comprising two or three ethylene polymers of different molecular weights. The free radical initiator treatment is disclosed to be necessary to obtain a desired increase in the die swell of the resin composition.

U.S. Pat. No. 4,461,873, issued Jul. 24, 1984, and U.S. Pat. No. 4,547,551, issued Oct. 15, 1985, both to F. W. Bailey et al., each discloses blends of high molecular weight and low molecular weights ethylene polymers of purportedly narrow molecular weight distribution, useful in the production of films and blow-molded articles.

U.S. Pat. No. 4,048,412, issued Sep. 13, 1977 to Caumartin et al., discloses a process for the polymerization of olefins, e.g., ethylene, in a series of reaction vessels each operating in the gas phase and containing a fluidized bed of polymer and catalyst comprising a transition metal and organo-metallic compound as cocatalyst introduced into the first reactor, and wherein an additional amount of cocatalyst is introduced into a reactor other than the first. The patent discloses the use of different organoaluminum compounds as cocatalysts in the reactors for the purpose of varying the molecular weight distribution of the polymer.

U.S. Pat. No. 4,338,424, issued Jul. 6, 1982 to Morita et al., discloses a process for polymerizing olefins utilizing two gas phase polymerization zones, the first employing a higher hydrogen to olefin mole ratio to produce a low molecular weight (LMW) polymer and the second employing a lower hydrogen to olefin mole ratio to produce a high molecular weight (HMW) polymer. The process also includes a dilution zone between the two polymerization zones to which a fresh supply of olefin gas is added for feeding into the second polymerization zone.

U.S. Pat. No. 4,703,094, issued Oct. 27, 1987 to Raufast, discloses the production of polyolefins by the polymerization of alpha-olefins in the gas phase in several reactors, at least two of which are interconnected by a transfer device in which the gas mixture from the upstream reactor is subjected to decompression and compression stages, providing for elimination of the heat of reaction and degassing of the polymer powder.

U.S. Pat. No. 5,047,468, issued Sep. 10, 1991 to H. K. Lee et al., based on application filed Nov. 16, 1988, and corresponding European Published Patent Application No. 0 369 436, published May 23, 1990, disclose a process for the production of ethylene copolymers in the gas phase utilizing at least two fluidized bed reactors in series under conditions such that a high melt index copolymer is made in one reactor and a low melt index copolymer in the other. The disclosure states that the high and low melt index polymers can be made in any order. The catalyst employed is a complex of magnesium, titanium, a halogen, and an electron donor on an appropriate support such as a silica or alumina, in combination with an organoaluminum activator and co-catalyst.

U.S. Pat. No. 4,481,301, issued Nov. 6, 1984 to Nowlin et al., discloses catalysts for polymerizing alpha-olefins prepared by treating a support with an organo-magnesium compound and contacting the supported magnesium composition in a liquid medium with a tetravalent titanium compound.

Pending parent application Ser. No. 07/665,054, filed Mar. 6, 1991 (now abandoned), discloses a process for producing bimodal ethylene polymers in gas phase, fluidized bed, tandem reactors wherein a high molecular weight (HMW) polymer is produced in the first reactor and a low molecular weight (LMW) polymer is produced in the second reactor and deposited on the HMW particles from the first reactor. The process utilizes certain specifically defined reaction conditions and may employ one of the Ziegler catalysts contemplated for the preparation of the product of this invention. The entire disclosure of this application is incorporated by reference.

Pending application Ser. No. 07/712,283, filed Jun. 10, 1991 (now abandoned), discloses and claims catalysts for the control of the molecular weight distribution of ethylene polymers, prepared by impregnating with a dialkylmagnesium a slurry of a porous inorganic support having reactive —OH groups, in a non-polar solvent, treating the resulting intermediate with $TiCl_4$, and reacting the Ti containing intermediate with an oxygen containing electron donor. Also disclosed and claimed is the use of the foregoing catalyst in a two stage gas phase tandem polymerization process in which a relatively high molecular weight (HMW) polymer is produced in a first reactor and transferred to a second reactor wherein a relatively low molecular weight (LMW) polymer is produced and combined with the HMW polymer.

Pending application Ser. No. 07/712,298, filed Jun. 10, 1991 (now abandoned), discloses and claims catalysts and their use in polymerization processes similar to those of Ser. No. 07/712,283 described in the preceding paragraph, except that in lieu of the reaction with an oxygen containing electron donor, the dialkylmagnesium-impregnated support is treated with a halogen containing reagent prior to the treatment with $TiCl_4$.

Pending application Ser. No. 07/734,989, filed Jul. 24, 1991 (now abandoned), discloses high molecular weight, high density ethylene polymers which may be formed with good processability into films having improved mechanical properties, and which may be produced by a process employing gas phase, fluidized bed, tandem reactors.

SUMMARY OF THE INVENTION

In accordance with this invention, relatively high molecular weight, high density ethylene polymer blends capable of being blow molded with excellent processability into articles, e.g., bottles, of superior mechanical properties, are provided, such polymer blends having a density of at least about 0.930 g/cc, a flow index ($I_{21}$) of at least about 2 g/10 min., a melt flow ratio (MFR) of at least about 60, and a Mw/Mn polydispersity index (P.I., as hereinafter defined) of at least about 8.

The ethylene polymer blends of this invention in general are bimodal blends in which the polymers consist essentially of relatively high molecular weight (HMW) and low molecular weight (LMW) ethylene polymers, with the HMW component present, for example, at a weight fraction of at least about 0.3 of such ethylene polymer content and having a density of at least about 0.900 g/cc, a flow index ($I_{21}$) of, for example, at least about 0.2 g/10 min., and a relatively broad molecular weight distribution indicated by a flow ratio (FR, as hereinafter defined), for example, at least about 12, and the LMW component having a density of at least about 0.930 g/cc and a melt index ($I_2$) of no greater than about 1000 g/10 min.

The ethylene polymer compositions of this invention can be blow molded with an adequate degree of weight swell and low melt fracture into articles having superior mechanical and other properties. In particular, the resin compositions may be blow molded into bottles and other articles having high levels of environmental stress cracking resistance (ESCR). This desirable combination of good processability and superior end use properties of the polymer product is obtained as a result of the entire combination of parameters specified previously, including the presence of HMW and LMW polymer components each having specifically defined properties. However, it has been found that a particularly significant factor in obtaining such a product is the use of an HMW component which itself has a relatively broad molecular weight distribution as indicated by the defined high value of flow ratio (FR) of such component.

DETAILED DESCRIPTION OF THE INVENTION

The HMW and LMW components of the ethylene polymer blends of this invention preferably consist essentially of either 1) a homopolymer of ethylene; 2) at least one copolymer of a preponderance of ethylene with a minor amount of a 1-olefin containing 3 to about 10 carbon atoms, e.g., 1-butene, 1-pentene, 1-hexene, 4-methyl-1-pentene, 1-octene, 1-decene, and mixtures thereof; or 3) a mixture of any of the foregoing polymers. Preferred comonomers are 1-hexene and 1-butene. In general, each polymer component will comprise an amount of polymerized comonomer which is in the range, for example, of about 0 to 15 weight percent, based on the total weight of polymer.

The density of the ethylene polymer blend product of this invention will generally be, for example, at least about 0.930 g/cc, preferably about 0.939 to 0.960 g/cc, and most preferably about 0.950 to 0.960 g/cc.

The flow index or high load melt index of the ethylene polymer blend product of this invention ($I_{21}$, measured at 190° C. in accordance with ASTM D-1238, Condition F) is generally at least about 2, preferably from about 5 to 50, and most preferably about 5 to 40 g/10 min., while the melt flow ratio (MFR), defined as the ratio of flow index ($I_{21}$) to melt index ($I_2$), measured at 190° C. in accordance with ASTM D-1238, Condition E, is at least about 60, preferably about 70 to 300, and most preferably about 80 to 200.

The polydispersity index of the polymer product, which is the ratio of weight average molecular weight (Mw) to number average molecular weight (Mn), is at least about 8, preferably about 10 to 18, and most preferably about 11 to 17. Mw and Mn of a polymer are calculated from its molecular weight distribution (MWD) determined by gel permeation chromatography.

As stated, the ethylene polymer of this invention will in most cases consist essentially of a bimodal blend of relatively high molecular weight (HMW) and low molecular weight (LMW) ethylene polymers with the HMW component being present, for example, at a weight fraction of at least about 0.3 of the ethylene polymer content. Such HMW component is preferably present at a weight fraction of about 0.4 to 0.7, more preferably about 0.45 to 0.60, with the remainder of the ethylene polymer being the LMW component. In addition, the HMW component will generally have a density of at least about 0.900 g/cc, preferably about 0.920 to 0.950 g/cc, and more preferably about 0.930 to 0.945 g/cc; a flow index or high load melt index ($I_{21}$) of at least about 0.2, preferably from about 0.2 to 5, and more preferably about 0.5 to 4 g/10 min.; a flow ratio (FR, defined as the ratio of flow index [$I_{21}$] to intermediate load melt index [$I_5$], measured at 190° C. under a load of 5 kilograms in accordance with ASTM D-1238, Condition P) at least about 10, preferably about 10 to 30, and more preferably about 16 to 25.

The LMW component will generally have a density of at least about 0.930 g/cc, preferably about 0.950 to 0.978 g/cc, and most preferably about 0.970 to 0.976 g/cc, and a melt index ($I_2$) of no greater than about 1000 g/10 min., preferably about 10 to 500 g/10 min., and more preferably about 30 to 300 g/10 min.

The ethylene polymer product of this invention is capable of being blow molded into articles, e.g., bottles, with high weight swell, e.g., a weight of standard 20 oz. pinch waist bottles of about 25 to 30 grams, and a low degree of melt fracture, e.g., with surface roughness below about 300 microinches, preferably below about 200 microinches. Furthermore, the ethylene polymer product of this invention will generally have a bent strip environmental stress cracking resistance (ESCR, $F_{50}$) of at least about 300 hr., preferably at least about 500 hr., at a density no higher than about 0.958 g/cc, measured in accordance with ASTM D-1693 using a specimen of 70 mil thickness, 10% Igepal nonionic surfactant and a temperature of 50° C.

In preparing the ethylene polymer of this invention consisting essentially of HMW and LMW ethylene polymer components as previously described, such components may be prepared separately and physically blended in a conventional manner, e.g., by initially dry blending the resin in a mixer with suitable additives, and then melt blending it in an extruder. The relative proportions of the HMW and LMW components are such that the blending produces an ethylene polymer product having the desired properties of density, flow index ($I_{21}$), and melt flow ratio (MFR). Preferably, however, the desired bimodal ethylene polymer blend is directly produced by means of a gas phase, fluidized bed, tandem reactor process as described hereinafter in this specification and in parent application Ser. No. 07/665,054, filed Mar. 6, 1991, by A. H. Ali et al., the entire disclosure of which is incorporated by reference. Whichever method is used, the described desirable properties of the ethylene polymer blend obtained are particularly dependent on the properties of the HMW component, especially its average molecular weight as indicated by its flow index (FI or $I_{21}$) and its molecular weight distribution as indicated by its flow ratio (FR), and these properties are in turn related to the catalyst employed in the polymerization reaction.

In utilizing a gas phase, fluidized bed, tandem reactor process to obtain the product of this invention, bimodal ethylene polymer blends having the described combination of good processability and superior mechanical properties are produced by a process including the steps of polymerizing gaseous monomeric compositions comprising a major proportion of ethylene in at least two gas phase, fluidized bed reactors operating in the tandem mode under the following conditions. In the first reactor, a gas comprising monomeric composition and, optionally, a small amount of hydrogen, is contacted under polymerization conditions with an appropriate catalyst, preferably a Ziegler-Natta or coordination catalyst as described more fully hereinafter, comprising a transition metal compound as primary catalyst component and a reducing agent such as an organo-metallic compound as cocatalyst. Certain chromium oxide catalysts may also be used, as described more fully hereinafter.

More particularly, the conditions utilized in the first reactor include a hydrogen/ethylene molar ratio of no higher than about 0.35 and an ethylene partial pressure no higher than about 100 psia such as to produce a relatively high molecular weight (HMW) polymer powder wherein the polymer is deposited on the catalyst particles. The HMW polymer powder containing the catalyst is then transferred to a second reactor with, optionally, additional cocatalyst if a cocatalyst is employed, which may be the same or different from the cocatalyst utilized in the first reactor and with or without additional transition metal catalyst component, together with a gaseous mixture comprising hydrogen and monomeric composition wherein additional polymerization is carried out at a hydrogen/ethylene molar ratio of at least about 0.5, the ratio being sufficiently high such that it is at least about 1.5 times that in the first reactor, and an ethylene partial pressure at least 1.7 times that in the first reactor, to produce a relatively low molecular weight (LMW) polymer much of which is deposited on and within the HMW polymer/catalyst particles from the first reactor, such that the fraction of HMW polymer in the bimodal polymer leaving the second reactor is at least about 0.3.

The foregoing conditions provide for a process wherein the production of fines tending to foul compressors and other equipment is kept to a relatively low level. Moreover, such conditions provide for an inhibited level of productivity in the first reactor with a resulting increased level of productivity in the second reactor to produce a bimodal polymer blend having properties as previously described and a high degree of homogeneity (indicated by low level of gels) caused by a substantial degree of blending of HMW and LMW polymer in each final polymer particle inherently resulting from the process operation. The bimodal blend is capable of being blow molded without undue difficulty into articles such as bottles having superior mechanical and other properties, e.g., high environmental stress cracking resistance and low melt fracture.

The gaseous monomer entering each reactor may consist wholly of ethylene or may comprise a preponderance of ethylene and a minor amount of a comonomer such as a 1-olefin containing 3 to about 10 carbon atoms. Comonomeric 1-olefins which may be employed are, for example, 1-butene, 1-pentene, 1-hexene, 4-methyl-1-pentene, 1-octene, 1-decene, and mixtures thereof. The comonomer may be present in the monomeric compositions entering either or both reactors.

In many cases, the monomer composition will not be the same in both reactors. For example, the monomer entering the first reactor may contain a minor amount of comonomer such as 1-hexene so that the HMW component of the bimodal product is a copolymer, while the monomer fed to the second reactor may consist essentially of ethylene so that the LMW component of the product is substantially an ethylene homopolymer. The amount of comonomer may be in the range, for example, of about 0 to 15, preferably about 0 to 10 weight percent, based on the total weight of polymer produced in the tandem process.

Hydrogen may or may not be used to modulate the molecular weight of the HMW polymer made in the first reactor. Thus, hydrogen may be fed to the first reactor such that the molar ratio of hydrogen to ethylene ($H_2/C_2$ ratio) is, for example, up to about 0.35, preferably about 0.005 to 0.2. In the second reactor it is necessary to produce a LMW polymer with a low enough molecular weight and in sufficient quantity so as to produce a bimodal resin which can be blow molded, with a minimum of processing difficulties, into articles such as bottles having a superior combination of mechanical properties. For this purpose, hydrogen is fed to the second reactor with the ethylene containing monomer such that the hydrogen to ethylene mole ratio in the gas phase is at least about 0.5, preferably in the range of about 0.5 to 5.0 and most preferably in the range of about 0.75 to 2.0. Moreover, to provide a sufficient difference between the molecular weights of the polymers in the first and second reactor so as to obtain a bimodal resin product having a wide enough molecular weight distribution necessary for the desired levels of processability and mechanical properties, the hydrogen to ethylene mole ratios in the two reactors should be such that the ratio in the second reactor is at least about 1.5 times the ratio in the first reactor, for example in the range 1.5 to 200 times such ratio, and preferably 3 to 30 times the ratio in the first reactor.

Utilizing the hydrogen to ethylene ratios set out previously to obtain the desired molecular weights of the HMW and LMW polymers produced in the first and second reactors respectively tends to result in relatively high polymer productivity in the first reactor and relatively low productivity in the second reactor. This tends to result in turn in a bimodal polymer product containing too little LMW polymer to maintain satisfactory processability. A significant part of this invention lies in the discovery that this effect can be largely overcome by employing ethylene partial pressures in the two reactors so as to reduce the polymer productivity in the first reactor and raise such productivity in the second reactor. For this purpose, the ethylene partial pressure employed in the first reactor is no higher than about 100 psia, for example in the range of about 15 to 100 psia, preferably in the range of about 20 to 80 psia and the ethylene partial pressure in the second reactor is, for example in the range of about 26 to 200 psia, preferably about 55 to 200 psia, with the ethylene partial pressures in any specific process being such that the ratio of ethylene partial pressure in the second to that in the first reactor is at least about 1.7, preferably about 1.7 to 7.0, and more preferably about 2.0 to 5.0.

In some instances, it may be advantageous to add an alkane, e.g., of about 5 to 8 carbon atoms, to the first (HMW) reactor for the purpose of reducing or eliminating static charge which often forms under the conditions employed in this reactor. Such charge, if not removed or reduced, has a tendency to cause catalyst and resin fines to migrate to the wall of the reactor where they may foul pressure taps causing erroneous readings for the bed level. Preferred alkanes for this purpose are isopentane which may be used, for example, at a partial pressure in the first reactor of at least about 35 psi, e.g., 35–60 psi, and n-hexane which may be used, for example, at a partial pressure of at least about 10 psi, e.g., 10–12 psi.

If desired for any purpose, e.g., to control superficial gas velocity or to absorb heat of reaction, an inert gas such as nitrogen may also be present in one or both reactors in addition to the monomer and hydrogen. Thus the total pressure in both reactors may be in the range, for example, of about 100 to 600 psig, preferably about 200 to 350 psig.

The temperature of polymerization in the first reactor may be in the range, for example, of about 60 to 130° C., preferably about 60 to 90° C., while the temperature in the second reactor may be in the range, for example, of about 80 to 130° C., preferably about 95 to 120° C. For the purpose of controlling molecular weight and productivity in both reactors, it is preferred that the temperature in the second reactor be at least about 10° C. higher, preferably about 20 to 60° C. higher than that in the first reactor.

The residence time of the catalyst in each reactor is controlled so that the productivity is suppressed in the first reactor and enhanced in the second reactor, consistent with the desired properties of the bimodal polymer product. Thus, the residence time may be, for example, about 0.5 to 6 hours, preferably about 1 to 4.5 hours in the first reactor, and, for example, about 1 to 12 hours, preferably about 2.5 to 5 hours in the second reactor, with the ratio of residence time in the second reactor to that in the first reactor being in the range, for example, of about 5 to 0.7, preferably about 2 to 0.8.

The superficial gas velocity through both reactors is sufficiently high to disperse effectively the heat of reaction so as to prevent the temperature from rising to levels which could partially melt the polymer and shut the reactor down, and high enough to maintain the integrity of the fluidized beds. Such gas velocity may be in the range, for example, of about 40 to 120, preferably about 50 to 90 cm/sec.

The productivity of the process in the first reactor in terms of grams of polymer per gram atom of transition metal in the catalyst multiplied by $10^6$, may be in the range, for example, of about 1.6 to 16.0, preferably about 2.0 to 9.6; in the second reactor, the productivity may be in the range, for example, of about 0.6 to 9.6, preferably about 1.6 to 3.5, and in the overall process, the productivity is in the range, for example, of about 2.2 to 25.6, preferably about 3.0 to 16.0. The foregoing ranges are based on analysis of residual catalyst metals in the resin product.

If it is desired to prepare the HMW and LMW components separately and subsequently physically blend them, each component may be produced in a single stage gas phase fluidized bed reactor employing process conditions within the ranges described for the two reactors utilized in the foregoing gas phase tandem reactor process. In either case, the specific process conditions are chosen in combination with an appropriate catalyst and weight fractions of the two components so as to obtain a final bimodal polymer having the desired combination of properties.

One suitable class of Ziegler catalysts for the preparation of the polymer products of this invention, particularly the HMW component, are those utilizing a supported Ti/Mg complex precursor prepared by a method consisting essentially of the following steps: to a previously dried, solid, porous, inorganic carrier, e.g., silica, containing active hydroxyl groups and slurried in an inert non-polar liquid medium, e.g., an alkane containing 5 to 12 carbon atoms, is added a dialkylmagnesium wherein the alkyl groups each contain, for example, 1 to 12, and preferably 4 to 8, carbon atoms and may be the same or different, e.g., dibutylmagnesium (DBM). The amount of added dialkylmagnesium, which is soluble in the non-polar medium, is at least sufficient to interact with the available hydroxy groups. In some cases, additional dialkylmagnesium is added sufficient to interact with other active groups on the surfaces of the carrier. In either case, there is substantially no excess of dialkylmagnesium after the interaction is completed, as indicated by the absence of any magnesium in the non-polar medium. To the slurry of magnesium containing intermediate is then added at least sufficient $TiCl_4$ to react with the supported Mg-containing intermediate. If just enough $TiCl_4$ is added to react with the intermediate the slurry may be evaporated to dryness and the resulting supported Ti/Mg complex precursor used directly in the polymerization process. If an amount of $TiCl_4$ is added which is in excess of that required to react with the Mg-containing intermediate the slurry must be filtered and the solids washed with non-polar solvent to remove the excess $TiCl_4$ before the supported Ti/Mg complex precursor is utilized.

The carrier material used in the preparation of the foregoing precursor is a solid, particulate, porous, inorganic material, such as oxides of silicon and/or aluminum, used in the form of a dry powder having an average particle size of from about 1 micron to about 250 microns, preferably from about 10 microns to about 150 microns. It has a surface area of at least about 3 square meters per gram ($m^2/gm$), and preferably at least about 50 $m^2/gm$, and should be dry, that is, free of absorbed water, which can be effected by heating to from about 100° C. to about 1000° C., preferably to about 600° C. When the carrier is silica, it is heated to at least 200° C., preferably from about 200° C. to about 850° C. and most preferably to about 600° C.

In the most preferred embodiment, the carrier is silica which, prior to the use thereof in the first catalyst synthesis step, has been dehydrated by fluidizing it with nitrogen and heating at about 600° C. for about 16 hours to achieve a surface hydroxyl group concentration of about 0.7 millimoles per gram (mmols/gm). The silica of the most preferred embodiment is a high surface area, amorphous silica (surface area=300 $m^2/gm$; pore volume of 1.65 $cm^3/gm$), and it is a material marketed under the trademarks of Davison 952 or Davison 955 by the Davison Chemical Division of W. R. Grace and Company. The silica is in the form of spherical particles, e.g., as obtained by a spray-drying process.

The initial slurry of the carrier material in the solvent is prepared by introducing the carrier into the solvent, preferably while stirring, and heating the mixture to about 25 to about 100° C., preferably to about 40 to about 65° C. The slurry is then contacted with the dialkylmagnesium while the heating is continued at the foregoing temperature. The reaction of $TiCl_4$ with the Mg-containing intermediate is generally carried out at a temperature of about 25 to 75° C., preferably about 30 to 65° C.

As stated, the foregoing supported Ti/Mg complex precursor is prepared by a method "consisting essentially" of certain steps as described. The term "consisting essentially" in this context means that the defined method excludes all steps and materials other than those defined, except those which do not affect the basic and novel characteristics of the described method and composition. As thus construed, the described method excludes such additional steps as the reaction of the supported Ti/Mg complex precursor with an oxygen-containing electron donor as disclosed in previously cited application Ser. No. 07/712,283, or reacting the supported Mg-containing intermediate (before the reaction with TiCl$_4$) with a halogen-containing reagent, as disclosed in previously cited application Ser. No. 07/712,298. In many cases, the method of preparing the contemplated supported Ti/Mg-containing precursor will be prepared by a method "consisting of", i.e., limited to, the stated steps and materials.

The foregoing supported Ti/Mg complex precursor is utilized with a hydrocarbyl aluminum cocatalyst of the type as described hereinafter. In some instances, a particularly high level of catalytic activity may be obtained by using as a cocatalyst diisobutylaluminum hydride (DIBAH) or triisobutylaluminum (TIBA).

Another group of catalysts suitable for the preparation of the products of this invention, particularly the HMW components, are prepared by treating a magnesium oxide (MgO) support with an organic acid, e.g., 2-ethyoxybenzoic acid, acetic acid, or actanoic acid, reacting the treated support with titanium tetrachloride, and pre-reducing the catalyst with an aluminum alkyl, e.g., triethylaluminum, tri-n-hexylaluminum, diisobutylaluminum hydride, or trimethylaluminum. During polymerization, a cocatalyst is used which may also be an aluminum alkyl such as any of those in the foregoing list of pre-reducing agents, although any of the other hydrocarbyl aluminums as hereinafter described may also be used.

The cocatalyst may, for example, have the formula AlR$_e$X'$_f$H$_g$ wherein X' is Cl or OR'; R and R' are saturated aliphatic hydrocarbon radicals having 1 to 14 carbon atoms and are alike or different; f is 0 to 1.5; g is 0 or 1; and e+f+g=3. Examples of suitable R and R' radicals are: methyl, ethyl, propyl, isopropyl, butyl, isobutyl, tert-butyl, pentyl, neopentyl, hexyl, 2-methylpentyl, heptyl, octyl, isooctyl, 2-ethyhexyl, 5,5-dimethylhexyl, nonyl, isodecyl, undecyl, dodecyl, cyclohexyl, cycloheptyl, and cyclooctyl. Some examples of useful cocatalysts are triisobutylaluminum (TIBA), trihexylaluminum, diisobutylaluminum hydride (DIBAH), dihexylaluminum hydride, diisobutylhexylaluminum, trimethylaluminum (TMA), triethylaluminum (TEAL), diethylaluminum chloride, Al$_2$(C$_2$H$_5$)$_3$Cl$_3$, and Al(C$_2$H$_5$)$_2$(OC$_2$H$_5$).

In preparing the polymer by the gas phase tandem reactor process using a contemplated Ziegler-Natta catalyst, it is preferred that the titanium/magnesium precursor not be combined with the hydrocarbyl aluminum cocatalyst, other than that used for pre-reduction, prior to being fed to the first reactor, but that these components be fed to such reactor separately, and that an additional quantity of the hydrocarbyl aluminum cocatalyst be fed to the second reactor in an amount sufficient to increase catalyst activity in the second reactor. The cocatalyst is fed to each reactor neat or as a solution in an inert solvent such as isopentane.

The amount of cocatalyst utilized in the Ziegler-Natta catalyst employed in the process of making the products of this invention whether for pre-reduction or activation of the catalyst prior to polymerization or added to the sole reactor or the first reactor of a tandem reactor process or both, is generally in the range, for example, of about 2 to 100 gram atoms of cocatalyst metal, e.g., aluminum, per gram atom of transition metal, e.g., titanium, preferably about 5 to 50 gram atoms of cocatalyst metal per gram atom of transition metal. Any amount of cocatalyst added to the second reactor is not included in the foregoing ranges. However, it is preferred that additional cocatalyst be fed to the second reactor to increase catalyst activity.

Another class of catalysts suitable for the production of at least the HMW component or both components in a gas phase, fluidized bed, tandem reactor process are those comprising a chromium oxide and tetravalent titanium supported on a refractory oxide, e.g., silica, alumina, thoria or zirconia, or a mixture of these oxides, in which at least 75% of its pore volume consists of pores of about 200 to 500 Angstroms average pore diameter. The particles are non-spherical and irregular in shape and are generally within the range of 5 to 250 microns average diameter, with the median particle diameter being from about 50 to 100 microns. These catalysts are disclosed in greater detail in pending application Ser. No. 07/111,944, filed Oct. 22, 1987, by Hsieh et al., the entire disclosure of which is incorporated by reference.

As stated, the mechanical properties of articles blow molded from the resins of this invention are particularly dependent on the HMW component which in turn are sensitive to the catalyst used to prepare such component. Thus, the catalysts hereinbefore disclosed are preferred not only when a gas phase, fluidized bed, tandem reactor process is employed, but also for the preparation of the HMW polymer when the HMW and LMW polymers are prepared separately and subsequently physically blended. However, the properties of the LMW polymer significant to the invention are less sensitive to the specific catalyst used so that any catalyst, e.g., Ziegler or chromium oxide catalyst, capable of forming linear polymers may be employed when separately preparing such polymer.

Figure 1:
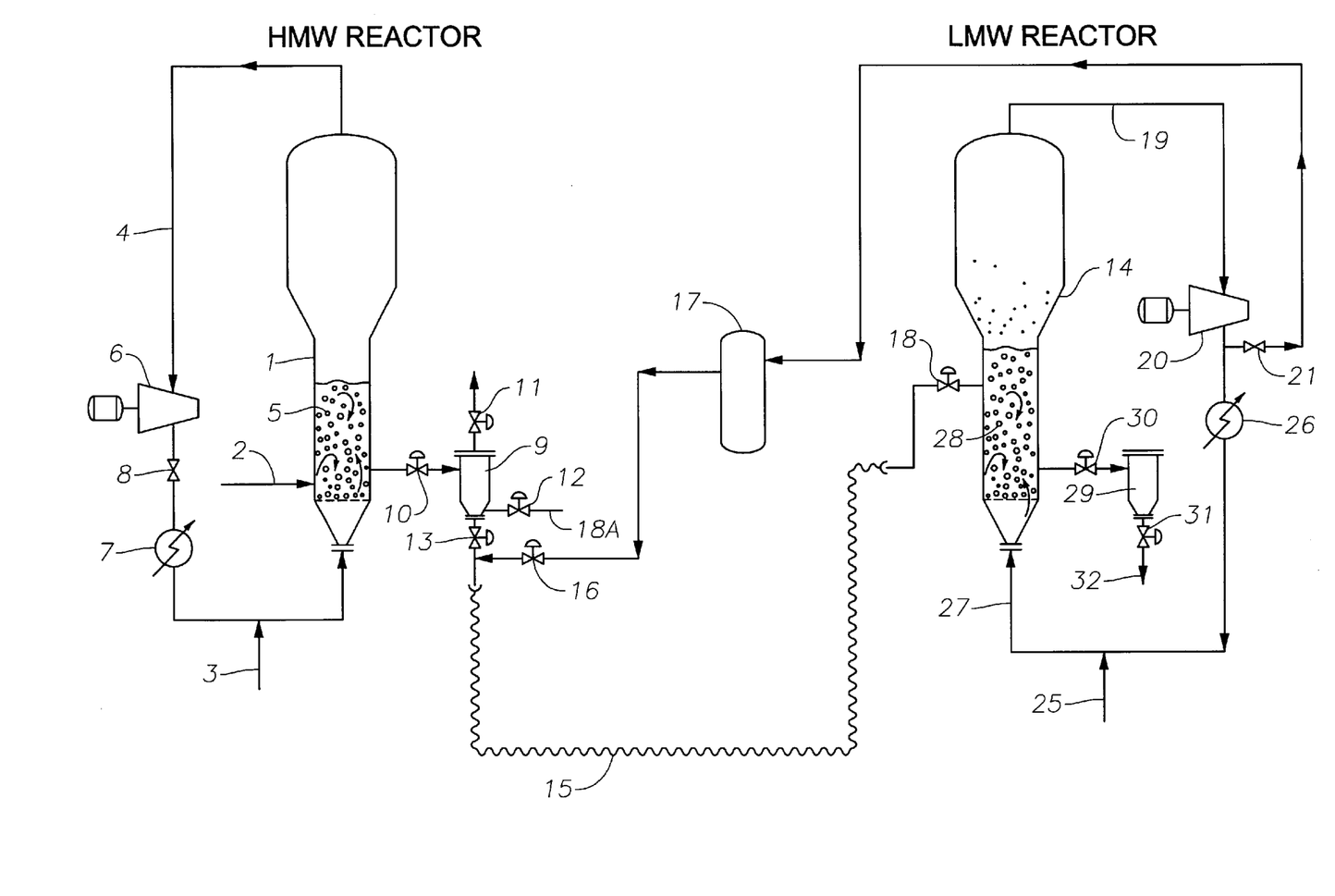
The drawing is a schematic diagram of a gas phase tandem reactor polymerization process which can be used to make the products of this invention.

Referring now to the drawing, a catalyst component containing transition metal, e.g., titanium, or a chromium oxide catalyst as hereinbefore described, is fed into first reactor 1 through line 2. Ethylene, comonomer, e.g., 1-hexene, if used, hydrogen, if used, alkane, e.g., isopentane, if used, inert gas such as nitrogen, if used, and cocatalyst, e.g., an aluminum alkyl, if a Ziegler-Natta catalyst is being employed, are fed through line 3 into recycle line 4 where they are combined with recycle gas and fed into the bottom of reactor 1. The gas velocity is high enough and the size and density of the particles in reactor 1 are such as to form a fluidized or dense bed 5 comprising catalyst particles associated with polymer formed by the polymerization of ethylene and, if present, comonomer within reactor 1. The conditions in reactor 1, e.g. partial pressure of ethylene, hydrogen/ethylene molar ratio, temperature, etc. are controlled such that the polymer which forms is of relatively high molecular weight (HMW). Recycle gas leaving the top of reactor 1 through line 4 is recompressed in compressor 6, cooled in heat exchanger 7 after passing through valve 8 and are fed to the bottom of reactor 1 after being combined with make-up gases and cocatalyst from line 3 as described.

Periodically, when sufficient HMW polymer has formed in reactor 1, the polymer and catalyst 1 are transferred to discharge tank 9 by opening valve 10 while valves 11, 12 and 13 remain closed. When an amount of the HMW polymer and catalyst from reactor 1 which is desired to be transferred has been fed to discharge tank 9, the transfer system to second reactor 14 is activated by opening valve 13 to force the HMW polymer and catalyst into transfer hose 15. Valve 13 is then closed to isolate transfer hose 15 from discharge tank 9 and valve 11 is opened, ensuring that any gases leaking through valve 13 are vented and do not back-leak across valve 10 into reactor 1. Transfer hose 15 is then pressurized with reactor-cycle gas from reactor 14 by opening valve 16. To minimize upsets in reactor 14, surge vessel 17 is used to store gas for pressuring transfer hose 15. With valve 16 still in the open position, valve 18 is opened to convey HMW polymer and catalyst into reactor 14. Both valves 16 and 18 are left open for a period to sweep transfer hose 15. Valves 18 and 16 are then closed sequentially. Transfer hose 15 is then vented by opening valve 13, valve 11 having remained open during the transfer operation. Discharge tank 9 is then purged with purified nitrogen through line 18A by opening valve 12.

During the transfer, cycle gas comprising hydrocarbons and hydrogen leaves reactor 14 through line 19, is compressed by compressor 20, flows through valve 21 in line 24 and through surge tank 17, valve 16 and pressurized transfer hose 15 as described, thus effecting the transfer of HMW polymer and catalyst to reactor 14.

After the transfer to reactor 14 is effected, the flow of gas from reactor 14 to transfer hose 15 is stopped by closing valves 21 and 16. Ethylene, hydrogen, comonomer, e.g., 1-hexene, if used, inert gas such as nitrogen, if used, and cocatalyst or catalyst component, e.g., TEAL or DIBAH, are fed to reactor 14 through line 25 after being combined with unreacted cycle gas leaving the top of reactor 14 through line 19 which is compressed in compressor 20, cooled in heat exchanger 26 and enters the bottom of reactor 14 through line 27. The gas velocity and size and density of the particles in reactor 14 are such as to form fluidized or dense bed 28 of bimodal polymer particles associated with the catalyst, including the transition metal primary catalyst component added to reactor 1. The conditions in reactor 14, e.g., partial pressure of ethylene, hydrogen/ethylene ratio and temperature, are controlled such that a relatively low molecular weight (LMW) polymer forms primarily on and within the HMW polymer/catalyst particles transferred from reactor 1. After a sufficient amount of LMW polymer has formed resulting in a bimodal polymer having a desirable molecular weight distribution and other properties, the polymer is transferred to discharge tank 29 by opening valve 30 while keeping valve 31 closed. After substantially all the polymer has been transferred to discharge tank 29, it is collected by closing valve 30 and opening valve 31, resulting in the pressure discharge of the final polymer product through line 32.

The following examples further illustrate the invention.

EXAMPLE 1

A catalyst was prepared as follows: 335.0 grams of Davison 955 silica which was previously dried at 600° C. for about 16 hours under nitrogen were transferred into a 4-neck 3-liter round-bottom flask fitted with an overhead stirrer and kept under a slow nitrogen purge. 1500 ml of dry heptane were added to the flask which was placed in an oil bath set at 60–65° C. Next, 236 ml of a 1.02 Molar solution of dibutylmagnesium (DBM) in heptane were added dropwise using an additional funnel. After 95 minutes, 39.8 ml of titanium tetrachloride diluted with about 50 ml of heptane were added to the silica/DBM slurry. After 60 minutes, the heptane was removed by evaporation with a strong nitrogen purge for 6 hours. About 360 grams of a brown, free-flowing catalyst powder was recovered. Analysis: Mg=1.43 wt. %; Ti=4.10 wt. %; Ti/Mg =1.45.

Using the foregoing catalyst, a gas phase, fluidized bed polymerization process was carried out using two reactors operating in the HMW-first tandem mode as shown in the drawing. The process included the feeding of 1-hexene as comonomer and diisobutylaluminum hydride (DIBAH) as cocatalyst to both reactors. Nitrogen was used to control the total pressure in both reactors at about 300 psig. Averages of other conditions in both reactors, which were controlled to produce a high density bimodal resin suitable for being blow molded into articles such as bottles with superior mechanical properties, are shown in Table I, wherein "$PC_2^=$" is the partial pressure of the ethylene, "$H_2/C_2$" is the molar ratio of hydrogen to ethylene, "$C_6/C_2$" is the molar ratio of 1-hexene to ethylene in the gas phase, and "$IC_5$" is the partial pressure of isopentane.

TABLE I

|  | Reactor 1 (HMW) | Reactor 14 (LMW) |
| --- | --- | --- |
| Temp. (° C.) | 75 | 110 |
| $PC_2^=$ (psi) | 37 | 153 |
| $H_2/C_2$ | 0.12 | 0.84 |
| $C_6/C_2$ | 0.019 | 0.0 |
| $IC_5$ (psi) | 52 | 0.0 |
| DIBAH (ppmw) | 635 | 234 |
| Resid. Time (hrs) | 3.8 | 4.5 |

The HMW polymer leaving reactor 1 was found by direct measurement to have a flow index ($I_{21}$) of 1.2 g/10 min., a flow ratio (FR) of 23, and a density of 0.941 g/cc, while the LMW polymer produced in reactor 14 was calculated from a single reactor process model to have a melt index ($I_2$) of about 35 g/10 min. and a density of about 0.974 g/cc.

The granular bimodal polymer obtained from reactor 14 had a fraction of HMW component of 0.45 and the final polymer contained about 15 ppm of titanium ash. This is an indication of the amount of titanium precursor used in the process since substantially all the titanium in such precursor is present in the final polymer.

Using standard procedures and a Banbury mixer, the granular bimodal polymer from reactor 14 was compounded into pellets having a flow index ($I_{21}$) of about 34 g/10 min., a MFR of about 110, a density of 0.956 g/cc, and a polydispersity index of 10.7.

The swell characteristics of the resin were evaluated by blow molding it into a standard 20 oz. pinch waist bottle using an improved B-13 reciprocating blow molding machine at 400° F., 2 sec. parison drop time and about 1500 psi injection pressure. The bottle had a weight of 25.6 grams and the melt fracture was below about 190 microinches.

The blow molded resin had a bent strip ESCR, $F_{50}$, of 800 hrs. at a density of 0.956, determined in accordance with ASTM D-1693 using a specimen of 70 mil thickness, 10% Igepal nonionic surfactant and a temperature of 50° C.

EXAMPLE 2

A catalyst was prepared as follows: 281.1 grams of Davison 955 silica which was previously dried at 600 ° C. for about 16 hours under nitrogen were transferred into a 4-neck 3-liter round-bottom flask fitted with an overhead stirrer and kept under a slow nitrogen purge. 1300 ml of dry heptane were added to the flask and the flask was placed into an oil bath set at 55° C. Next, 198 ml of a 1.02 Molar solution of DBM in heptane were added dropwise using an additional funnel. After 60 minutes, 28.0 ml of titanium tetrachloride diluted with about 30 ml of heptane were added to the silica/DBM slurry. After 90 minutes, the heptane was removed by evaporation with a strong nitrogen purge for 6 hours. About 337 grams of a brown, free-flowing catalyst powder was recovered. Analysis: Mg=1.47 wt. %; Ti=3.80 wt. %; Ti/Mg=1.32.

The procedure of Example 1 was followed using the foregoing catalyst under slightly different process conditions as shown in Table II:

TABLE II

|  | Reactor 1 (HMW) | Reactor 14 (LMW) |
|---|---|---|
| Temp. (° C.) | 75 | 110 |
| $PC_2^-$ (psi) | 43 | 198 |
| $H_2/C_2$ | 0.23 | 0.79 |
| $C_6/C_2$ | 0.021 | 0.0 |
| $IC_5$ (psi) | 53 | 0.0 |
| DIBAH (ppmw) | 336 | 115 |
| Resid. Time (hrs) | 4.1 | 4.4 |

The HMW component leaving reactor 1 was found by direct measurement to have the following properties: $I_{21}$=3.0 g/10 min.; FR=23; and density=0.942 g/cc; the LMW was calculated to have a melt index ($I_2$) of 30 (estimated from GPC) and a density of 0.974 g/cc; and the pellets prepared from the granular bimodal blend polymer from reactor 14 had the following properties: HMW weight fraction=0.54; $I_{21}$=34 g/10 min.; MFR=99; polydispersity index=9.8; and density=0.955 g/cc. On being blow molded as shown in Example 1, the resin exhibited an a bottle weight of 27.5 grams, a melt fracture of below about 200 microinches, and a bent strip ESCR, $F_{50}$, of 600 hrs., at a density of 0.955 g/cc.

EXAMPLE 3

HMW and LMW components intended to be physically blended in producing a high density bimodal polymer in accordance with this invention were separately prepared in a single stage gas phase reactor. The catalyst used to polymerize the HMW component was prepared as follows: 314.5 grams of Davison 955 grade silica, previously calcined at 600° C. for 12 hours, was transferred into a 4-neck, 3-liter round-bottom flask fitted with an overhead stirrer and under a slow nitrogen purge. The flask was placed into an oil bath at 60–65° C. and about 1200 ml of dry hexane and 222 ml of dibutylmagnesium (1.02 Molar solution in heptane) were added. The contents of the flask were stirred for about one hour, after which 24.8 ml of titanium tetrachloride, diluted with about 75 ml of dry hexane, were added. After about one hour, the solvents were removed by rapid evaporation aided with a nitrogen purge. Yield: 373 grams of dark brown free-flowing powder. Analysis: Mg=1.33 wt. %; Ti=2.74 wt. %; Cl=8.17 wt. %; silica=84.3 wt %.

For use in the polymerization of the LMW component a catalyst was prepared by reacting $MgCl_2$, tetrahydrofuran (THF) and $TiCl_3.0.33 AlCl_3$, adding the resulting complex to dehydrated silica treated with sufficient triethylaluminum to react with the OH groups in the silica but not enough to function significantly as partial activator or cocatalyst, drying the resulting silica supported catalyst precursor and pre-reducing or partially activating the supported precursor with tri-n-hexylaluminum, as cocatalyst. The procedure used to prepare the catalyst was substantially that of Example 4 of U.S. Pat. No. 4,888,318 except that the partial activation of the supported magnesium and titanium precursor was carried out with tri-n-hexylaluminum alone as partial activator rather than the latter together with diethylaluminum chloride as shown in the patent. The free-flowing catalyst powder contained the following weight percentages of components: Ti, 1.07; Mg, 1.7; Cl, 7.5; THF, 14.3; and Al, 1.98.

Each polymerization was carried out in a gas phase, fluidized bed reactor having a bed volume of 4.0 ft³ and operated at a total pressure of about 350 psig. Other reactor conditions employed in the preparation of the two components are shown in Table III, where "TMA" is trimethylaluminum and "TEAL" is triethylaluminum.

TABLE III

|  | HMW | LMW |
|---|---|---|
| Temp. (° C.) | 75 | 105 |
| $PC_2^-$ (psi) | 122 | 155 |
| $H_2/C_2$ | 0.1 | 0.94 |
| $C_6/C_2$ | 0.049 | 0.0 |
| TMA (ppmw) | 180 | — |
| TEAL (ppmw) | — | 510 |
| Resid. Time (hrs) | 2.5 | 3.4 |

The HMW component had the following properties: $I_{21}$= 1.2 g/10 min.; FR=16; and density=0.936 g/cc; while the LMW component had a melt index ($I_2$) of 80 g/10 min. and a density of 0.974 g/cc.

A blend of the HMW and LMW components was prepared by melt mixing in a twin-screw Brabender extruder with a conventional stabilizer package to prevent degradation. The blend had the following properties: HMW weight fraction=0.5; $I_2$=0.27; $I_{21}$=27 g/10 min.; MFR=100; density=0.955 g/cc; and a polydispersity index of 13. On being blow molded as shown in Example 1, the resin exhibited a bottle weight of 29.5 grams, a melt fracture of below about 100 microinches, and a bent strip ESCR of more than 1000 hrs. at a density of 0.955 g/cc.

EXAMPLE 4

The procedure of Example 3 was followed except that the LMW component had an $I_2$ of 200 g/10 min. and a density of 0.974 g/cc. The blend of HMW and LMW components had the following properties: $I_2$=0.32 g/10 min.; $I_{21}$=36 g/10 min.; MFR=112; density=0.957 g/cc; and polydispersity index =17. On being blow molded as shown in Example 1, the resin exhibited a bottle weight of 28 grams, a melt fracture of below about 100 microinches, and a bent strip ESCR of 700 hrs. at a density of 0.957 g/cc.

EXAMPLE 5

The procedure of Example 4 was followed using the same HMW and LMW components except that the HMW weight fraction of the blend was 0.6.

The blend had the following properties: $I_2$=0.14 g/10 min.; $I_{21}$=16 g/10 min.; MFR=107; density=0.950 g/cc; and polydispersity index=18. On being blow molded as shown in Example 1, the resin exhibited a bottle weight of 26.1 grams, a melt fracture of below about 200 microinches, and a bent strip ESCR of more than 1000 hrs. at a density of 0.950 g/cc.

EXAMPLE 6

A catalyst was prepared as follows:

Step 1 (Drying): Crosfield SD-186 silica (353 kg, made up of particles of about 5 to 250 microns containing 0.18 wt. % of Cr and having 86% of its pore volume in pores of between 200 and 500 A average pore diameter) was dried in the dehydrator at 200° C. for 16 hours. 313 kg of dehydrated silica were obtained.

Step 2 (Titanation): Dehydrated silica (313 kg) was added to the catalyst mix vessel. Fresh isopentane (2650 liters) was added to slurry the silica and tetraisopropyltitanate (517 kg) was charged at ambient temperature. The slurry was agitated at 55° C. for two hours. Drying took place over a 24-hour period with a jacket temperature of 80° C. under nitrogen purge (18 kg/hr).

Step 3 (Activation): Under good fluidization, the product of step 2 was heated at 25° C./hr to 200° C. and held at 200° C. for 2 hours. The temperature was then raised to 315° C. at a heating rate of 25° C./hr and held at 315° C. for 3 hours under nitrogen fluidization. The nitrogen atmosphere was changed to air and the temperature was held at 315° C. for four more hours. The temperature was then increased from 315° C. to 845° C. at 100° C./hr; and held for 16 hours at 845° C. in dry air. The temperature was then decreased to 150° C. as fast as possible. At 150° C., the air was again changed to nitrogen, and the temperature was decreased to ambient as fast as possible. The nitrogen was maintained for 1 hour at ambient temperature. The product was a yellow-orange solid catalyst and contained 0.18 wt. % of Cr and ca.4.5 wt. % of Ti.

The catalyst was used to prepare a HMW polymer component in a gas phase, fluidized bed system as described in Example 3 under the following specific conditions: Temp= 88.4° C.; PC=2=139 psi; $H_2/C_2$=0.33; and residence time= 5.1 hrs. The resulting HMW polymer had the following properties: $I_{21}$=1.5 g/10 min.; FR=34; and density=0.947 g/cc. Such HMW polymer was blended as shown in Example 3 with the same LMW component to yield a blend with the following properties: HMW weight fraction=0.5; $I_2$=0.32 g/10 min.; $I_{21}$=44 g/10 min.; MFR=131; density= 0.961 g/cc; and polydispersity index=12. On being blow molded as shown in Example 1, the resin exhibited a bottle weight of 29.1 grams, a melt fracture of below about 150 microinches, and a bent strip ESCR of 56 hrs. at a density of 0.961 g/cc. However, when the density is normalized to 0.956 g/cc, the ESCR is estimated to be on the order of about 200 hrs.

The results of the foregoing examples indicate that high density resins of this invention can be blow molded with adequate weight swell into articles such as bottles having superior mechanical properties.

Before being blow molded, the resins of this invention may be compounded with various additives utilized in relatively minor amounts, e.g., other polymers such as conventional low-density polyethylene (LDPE) and recycled polyethylene, stabilizers, anti-oxidants, plasticizers, fillers, etc., as are well known in the art.

We claim:

1. An ethylene polymer blend comprising a preponderance of polymerized ethylene having a density of at least about 0.930 g/cc, a flow index or high load melt index ($I_{21}$) of at least about 2 g/10 min., a melt flow ratio (MFR) of at least about 60, and a polydispersity index of at least about 8 but not greater than 18, the polymers of said blend consisting essentially of at least about 0.3 weight fraction of a relatively high molecular weight (HMW) component having a density of at least about 0.900 g/cc, a flow index or high load melt index ($I_{21}$) of at least about 0.2 g/10 min., and a flow ratio (FR) at least about 12, and a relatively low molecular weight (LMW) component having a density of at least about 0.930 g/cc and a melt index ($I_2$) no greater than about 1000 g/10 min.

2. The blend of claim 1 wherein said HMW and LMW components each is selected from the group consisting of 1) a homopolymer of ethylene; 2) at least one copolymer of a preponderance of ethylene with a minor amount of a 1-olefin containing 3 to about 10 carbon atoms as comonomer; and 3) a mixture thereof.

3. The polymer blend of claim 1 having a density of about 0.939 to 0.960 g/cc, an $I_{21}$ of about 5 to 50 g/10 min., a MFR of about 70 to 300, and a polydispersity index of from about 10 to not greater than 18, and wherein said HMW component is present at a weight fraction of about 0.4 to 0.7, and has a density of about 0.920 to 0.950 g/cc, and $I_{21}$ of about 0.2 to 5 g/10 min., and a FR of about 12 to 30, and said LMW component has a density of about 0.950 to 0.978 g/cc and an $I_2$ of about 10 to 500 g/10 min.

4. The blend of claim 3 having a density of about 0.950 to 0.960 g/cc, an $I_{21}$ of about 5 to 40 g/10 min., a MFR of about 80 to 200, and a polydispersity index of from about 11 to not greater than 18, and wherein said HMW component is present at a weight fraction of about 0.45 to 0.60, and has a density of about 0.930 to 0.945 g/cc, an $I_{21}$ of about 0.5 to 4 g/10 min., and a FR of about 16 to 25, and said LMW component has a density of about 0.970 to 0.976 g/cc and an $I_2$ of about 30 to 300 g/10 min.

5. An ethylene polymer blend comprising a preponderance of polymerized ethylene having a density of about 0.939 to 0.960 g/cc, a flow index or high load melt index ($I_{21}$) of at least about 2 g/10 min., a melt flow ratio (MFR) of about 70 to 300, and a polydispersity index of about 10 to not greater than 18, the polymers of said blend consisting essentially of (1) at least about 0.4 to 0.7 weight fraction of a relatively high molecular weight (HMW) having a density of at least about 0.920 to 0.950 g/cc, a flow index or high load melt index ($I_{21}$) of 0.2 to 5, and a FR of about 10 to 30, and (2) a relatively low molecular weight (LMW) component having a density of at least about 0.950 to 0.978 and a melt index ($I_2$) of about 10 to 500 g/min.

6. The blend of claim 5, wherein said HMW is selected from the group consisting of a homopolymer of ethylene; at least one copolymer of ethylene with a minor amount of a 1-olefin of 3 to 10 carbon atoms; and a mixture thereof, and said LMW is selected from the group consisting of a homopolymer of ethylene; at least one copolymer of ethylene with a minor amount of a 1-olefin of 3 to 10 carbon atoms; and a mixture thereof.

7. The blend of claim 6 wherein the amount of polymerized comonomer in each of said HMW and LMW components is in the range of about 0 to 15 weight percent, based on the total weight of each of said components.

8. The blend of claim 7 wherein said comonomer is 1-hexene or 1-butene.

9. A method comprising blow molding the polymer blend of claim 5 to produce an article having a melt fracture no greater than about 500 microinches and a bent strip environmental stress cracking resistance (ESCR, $F_{50}$) of at least about 300 hr. at a density no higher than about 0.958 g/cc.

10. The method of claim 9 wherein said melt fracture is below about 300 microinches, and said ESCR is at least about 500 hr. at a density no higher than about 0.958 g/cc.

11. The polymer blend of claim 5 produced by a process comprising contacting in a first gas phase, fluidized bed reaction zone under polymerization conditions, a gaseous monomeric composition comprising a major proportion of ethylene and, optionally, hydrogen, with a catalyst as hereinafter defined, the hydrogen/ethylene molar ratio ($H_2/C_2$ ratio) being no higher than about 0.35 and the ethylene partial pressure being no higher than about 100 psia, to produce said HMW component associated with catalyst particles, transferring said HMW component associated with catalyst particles to a second gas phase, fluidized bed reaction zone into which is also fed hydrogen and a gaseous monomeric composition comprising a major proportion of ethylene, under polymerization conditions including a $H_2/C_2$ ratio of at least about 0.6 and at least about 1.5 times that in said first reaction zone, and an ethylene partial pressure of at least 1.7 times that in said first reaction zone, to produce said LMW component deposited on and within the HMW component associated with catalyst particles, said catalyst is selected from the group consisting of 1), 2) and 3), wherein 1) is a supported Ti/Mg complex precursor prepared by the interacting of a previously dried hydroxyl-containing, solid, inorganic carrier slurried in a non-polar solvent with a dialkylmagnesium such that no substantial excess of magnesium remains in the slurry, and subsequently reacting the resulting supported Mg-containing intermediate with at least sufficient titanium tetrachloride to react with the hydroxyl groups on the carrier and form said precursor containing substantially no free $TiCl_4$, said precursor being used together with a hydrocarbyl aluminum cocatalyst; 2) is a supported Ti/Mg complex precursor prepared by treating a magnesium oxide (MgO) support with an organic acid, reacting the treated support with titanium tetrachloride, and pre-reducing the catalyst with an aluminum alkyl, said precursor being used together with a hydrocarbyl aluminum cocatalyst; and 3) is a catalyst comprising chromium oxide and tetravalent titanium supported on a refractory oxide in which at least 75% of its pore volume is in pores of about 200 to 500 Angstroms average pore diameter.

* * * * *